United States Patent

Ono

[15] 3,704,516
[45] Dec. 5, 1972

[54] LARGE DIAMETER PIPE CUTTING DEVICE

[72] Inventor: Teizo Ono, 4-32 Itachibori Kitadori Nishiku, Osaka, Japan

[22] Filed: Oct. 22, 1970

[21] Appl. No.: 82,892

[52] U.S. Cl..................................30/96, 269/2
[51] Int. Cl......................B23d 45/12, B23d 47/02
[58] Field of Search..........30/92, 93, 94, 96, 97, 102; 269/1, 2

[56] References Cited

UNITED STATES PATENTS

| | | | |
|---|---|---|---|
| 2,155,705 | 4/1939 | Gottwald | 269/2 |
| 2,291,395 | 7/1942 | Levey | 30/97 |
| 2,973,576 | 3/1961 | Hentke | 30/92 |
| 3,166,620 | 1/1965 | Galezniak | 30/96 UX |

Primary Examiner—Theron E. Condon
Attorney—Alfred W. Breiner

[57] ABSTRACT

This invention relates to a large diameter pipe cutting device for cutting a large diameter steel or cast pipe by moving a cutting machine vertically and bilaterally along the outer periphery of the pipe, said cutting machine including a two-parallelly opposed legged plate support and a cutter driven by an electric motor, said plate support being guided along the outer periphery of the pipe by a bush chain or chains wound tightly on the pipe in a relation forming a vertical plane meeting at right angles with the axis of the pipe.

5 Claims, 6 Drawing Figures

PATENTED DEC 5 1972　　　　　　　　　　　　　　　3,704,516
FIG.1
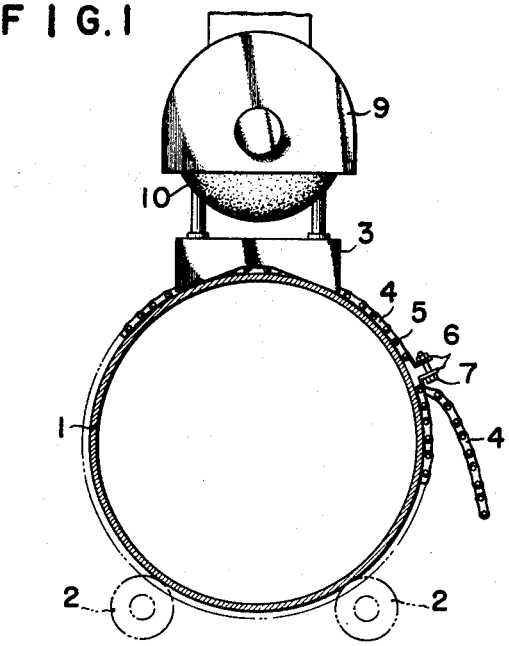
FIG.2
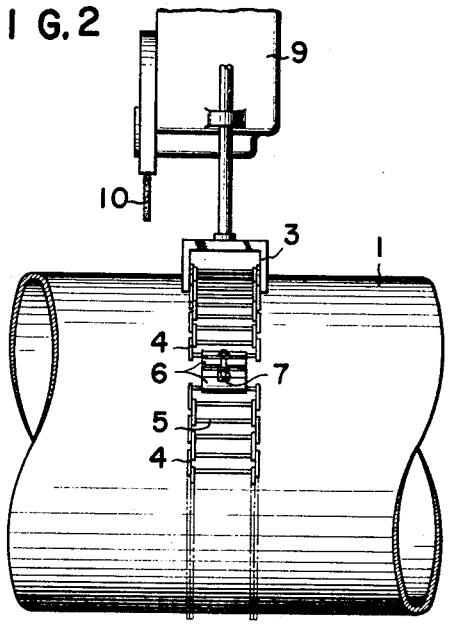
FIG.3
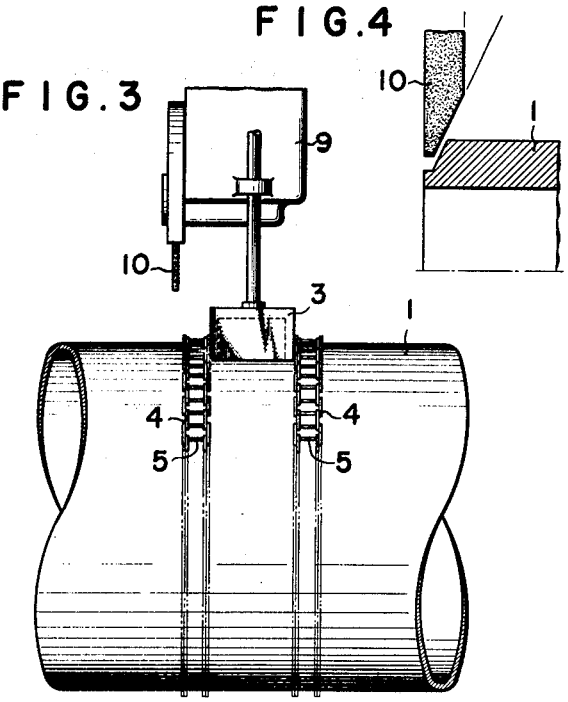
FIG.4
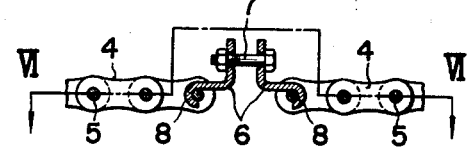
FIG.5
FIG.6

LARGE DIAMETER PIPE CUTTING DEVICE

This invention relates to a device for cutting a steel or cast pipe having an outer diameter of 0.8 to 1.5 meters along a vertical plane making a right angle with the axis of the pipe.

Among conventional methods of mechanically cutting a large diameter pipe there is included a method of cutting a large diameter pipe by clamping the pipe with the chuck of a large-size cutting device and turning a cutter along the periphery of the pipe, but the cutting device according to said method is too large to be carried by a workman and accordingly it cannot be used outside of the work shop where it is set. On the other hand, it often happens that this kind of cutting work is needed at the place where piping work is done. In such a case it is a practice to repeat partial cutting of a large diameter pipe with a portable cutter in the hand while turning the pipe. As the partial cutting of the kind described is repeated by a workman through his knack, the edge of the pipe cut is liable to incline, with the result that the last kerf is often brought out of alignment with the first kerf and this in turn not only distorts the cutting plane of the pipe but also wasteful trouble is involved. Also, a large-size chain type cutter may be used, but cutting of the large-size pipe with the large-size cutter requires many workmen and a great deal of time. That means reduced efficiency. Furthermore, the use of a cutting torch is possible, but as the surface of a torch cut pipe is rough, it must be given the last finish by hand.

This invention has eradicated the disadvantages inherent in the conventional methods of cutting a large diameter pipe at the place where piping work is done and provides a method of cutting the pipe in the manner in which cutting is always made in a vertical plane making a right angle with the axis of the pipe.

A primary object of this invention is to provide a cutting device which makes it possible to easily bring the cutting plane of a pipe into agreement with a vertical plane meeting at right angles with the axis of the pipe.

Another object of the invention is to provide a cutting device that can be carried by a workman so as to be used at the place where piping work is done.

Another object of the invention is to provide a cutting device which, when one type of cutter is changed for another type, can form in a pipe a kerf for use as a bevel end adapted to be welded with other pipe.

Still another object of the invention is to provide a cutting device capable of forming a smooth cut plane.

A preferred embodiment of the invention will now be described with reference to the accompanying drawing in which:

FIG. 1 is a front view of a cutting device equipped with a cutter guided by one bush chain that is wound on a large diameter pipe;

FIG. 2 is a side view of FIG. 1;

FIG. 3 is a side view of the cutting device in which two bush chains are used;

FIG. 4 is a fragmentary longitudinal sectional view showing a cutter used in forming a pipe end for welding with another pipe and the pipe end cut away into a bevel end;

FIG. 5 is a fragmentary front view of the bush chain; and

FIG. 6 is a sectional plan view taken along line VI—VI of FIG. 5.

A description will now be made of the invention with reference to an embodiment thereof. When a large diameter pipe 1 ( to be hereinafter referred to simply as a pipe ) is placed on supporting rollers 2 and a bush chain 4 large in width and slightly longer than the outer periphery of the pipe 1 is caused to be supported on the upper half part of the pipe, the chain 4 depends vertically with respect to the axis of the pipe 1 by its own empty weight. Furthermore, depending upon the case, two narrow chains as shown in FIG. 3 may be allowed to depend parallelly and spacedly apart a distance equal to the distance of the outsides of a two-legged plate support 3 along the outer periphery of the pipe. Thereafter, the lower ends 8 and 8 of L-shaped connecting plates 6 and 6 are respectively fitted over a spindle 5 at one end of the chain and another spindle 5 positioned closest to said spindle 5 at the other end of the chain, and the connecting plates 6 and 6 are tightened at the upper ends by bolts and nuts to make the chain grip securely the entire periphery of the chain. The same is also the case with two chains used as shown in FIG. 3.

An electric motor is placed in a cutter case 9 and a cutter 10 such as an emery wheel is mounted to the end of the motor shaft in such a manner that it is replaceable with any desired cutter. Beneath the case 9 is provided a two-legged plate support. The plate support 3 is of the construction in which the distance at which the two legs of the support face each other is such that the plate support 3 comes into close contact with the outside of the broad chain and with the inside of each of the two narrow chains. Also, as the case 9 is allowed to make free vertical movement with respect to the plate support 3, the cutter can be moved vertically and bilaterally.

In the present device it is an extremely important task to wind the chain or chains on the pipe in a vertical plane meeting at right angles with the axis of the pipe, and therefore it is only necessary to make a thick semi-circular steel band straddle over the pipe, said thick semi-circular steel band having a width equal to the width of the plate support 3 and coming into tight contact with the periphery of the pipe, and to wind the chain on the pipe so as to bring the chain into close contact with the side of the band. Preferably this method may be resorted to when two chains are used.

Now in operation. The pipe is placed on the supporting rollers 2, the cutter 10 mounted on the shaft of the motor is rotated, and the case 9 is manually lowered to make the cutter touch the outer surface of the pipe. When the case is gradually lowered and the cutter cuts its way through the pipe to expose its cutting edge under the inner periphery of the pipe, all that is necessary is to rotate the pipe progressively. If it is intended that the pipe being thus cut is welded with other pipe of the same diameter, the use of a cutter having the configuration shown in FIG. 4 will provide a bevel end.

As this invention is of the construction described in which a bush chain is wound on a large diameter pipe and the plate support of the cutting machine guided by the chain is moved exactly along the pipe periphery meeting at right angles with the axis of the pipe to cut the pipe by repeating partial cutting of the pipe, it can not only bring the last kerf always into alignment with the first kerp to provide a fine and exact pipe end forming a vertical plane with respect to the axis of the pipe but also can shorten a cutting time in a substantial degree by simplifying piping work and increasing efficiency in the work.

I claim:

1. A large diameter pipe cutting device comprising one broad chain formed by articulately connected links and spindles, a plurality of outermost ones of said links on each side of said chain lie in a common plane with said planes being parallel to each other and normal to the pipe axis, said outermost links defining guide surface means for guiding a cutting machine cutter relative to a pipe to be cut thereby, means between said planes for securing said chain in encircled relationship to a pipe thereby precluding obstructions along said outermost links, a cutting machine carrying said cutter, a support for said cutting machine, said support including a pair of spaced guiding legs, and said spaced guiding legs being in external embracing contacting relationship to said outermost links thereby being guided upon relative rotation between said chain and said support.

2. The large diameter pipe cutting device as defined in claim 1 including means mounting said cutting machine upon said support for radial sliding movement relative to said pipe.

3. A large diameter pipe cutting device comprising a pair of chains each formed by articulately connected links and spindles, a plurality of outermost ones of said links on each side of each chain lie in a common plane with said planes being parallel to each other and normal to the pipe axis, said pair of chains being mounted in encircled relationship to a pipe and in spaced parallel relationship to each other, said outermost links of said chains most adjacent each other defining guide surface means for guiding a cutting machine cutter relative to a pipe to be cut thereby, a cutting machine carrying said cutter, a support for said cutting machine, said support including a pair of spaced guiding surfaces, and said spaced guiding surfaces being in sandwiched relationship between and guiding contact with said most adjacent outermost links thereby being guided upon relative rotation between said chains and said support.

4. The large diameter pipe cutting device as defined in claim 3 including means mounting said cutting machine upon said support for radial sliding movement relative to said pipe.

5. The large diameter pipe cutting device as defined in claim 3 including means between the outermost links of each chain for securing said chains in encircled relationship to a pipe thereby precluding obstructions along said adjacent outermost links.

* * * * *